Patented Nov. 26, 1940

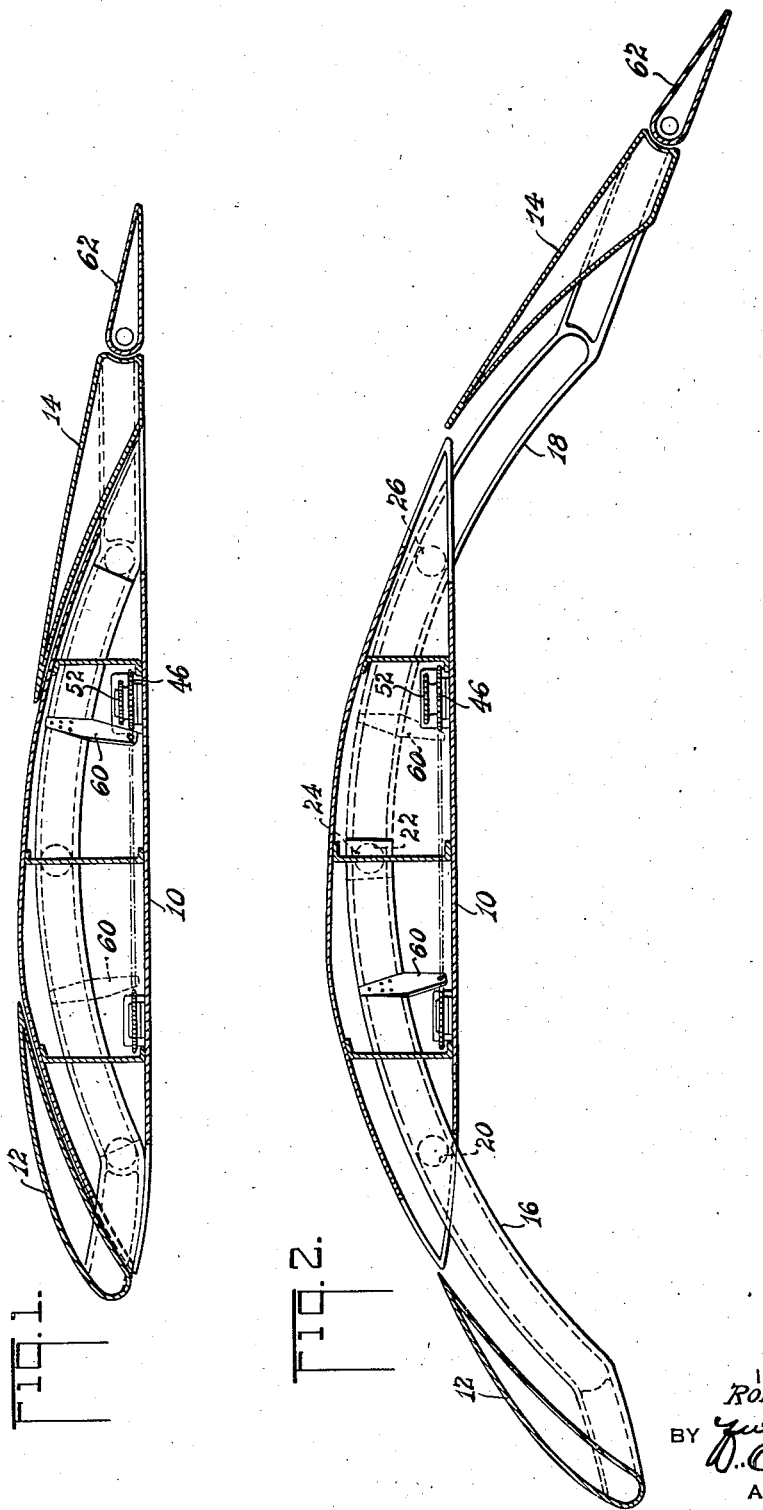

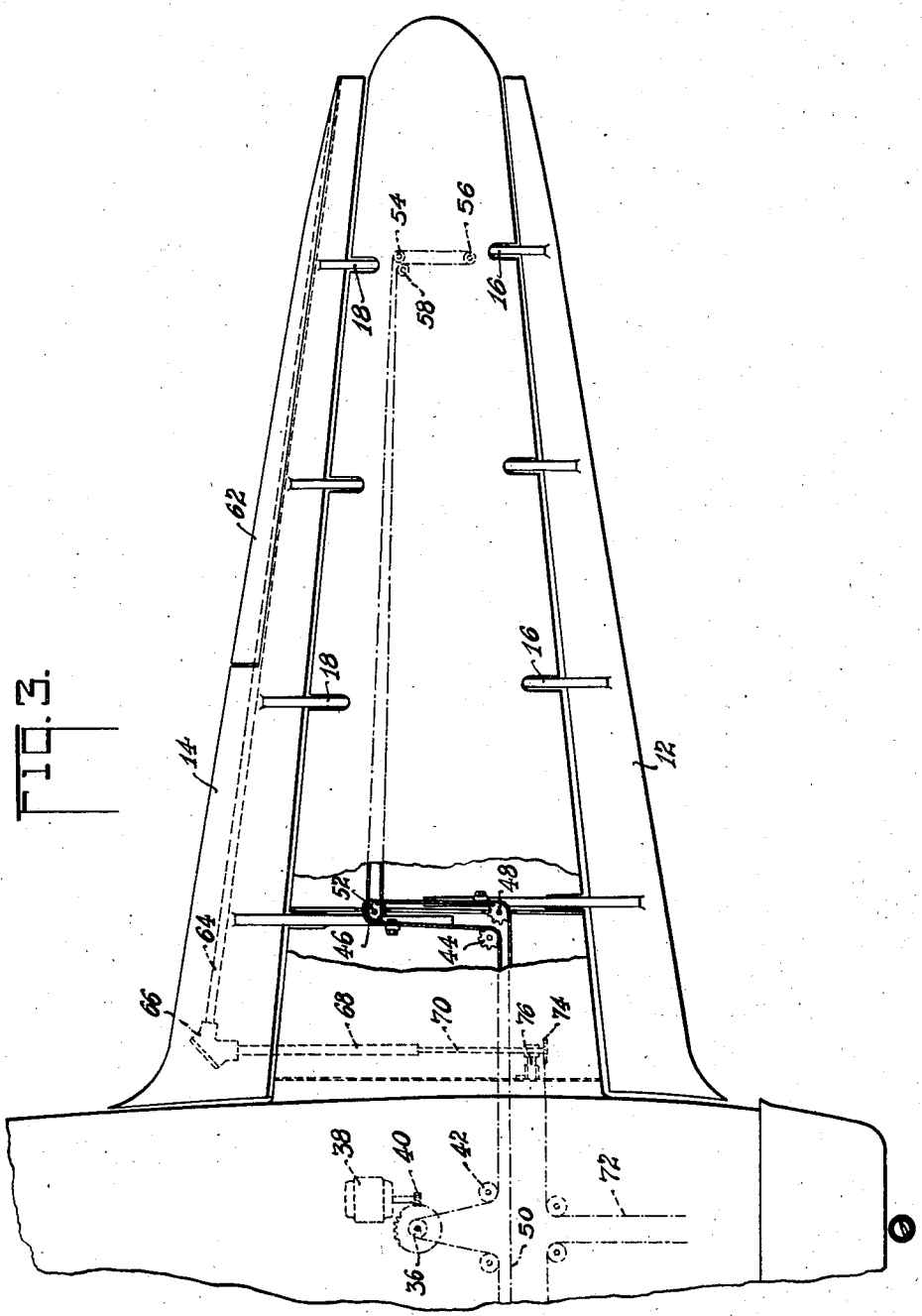

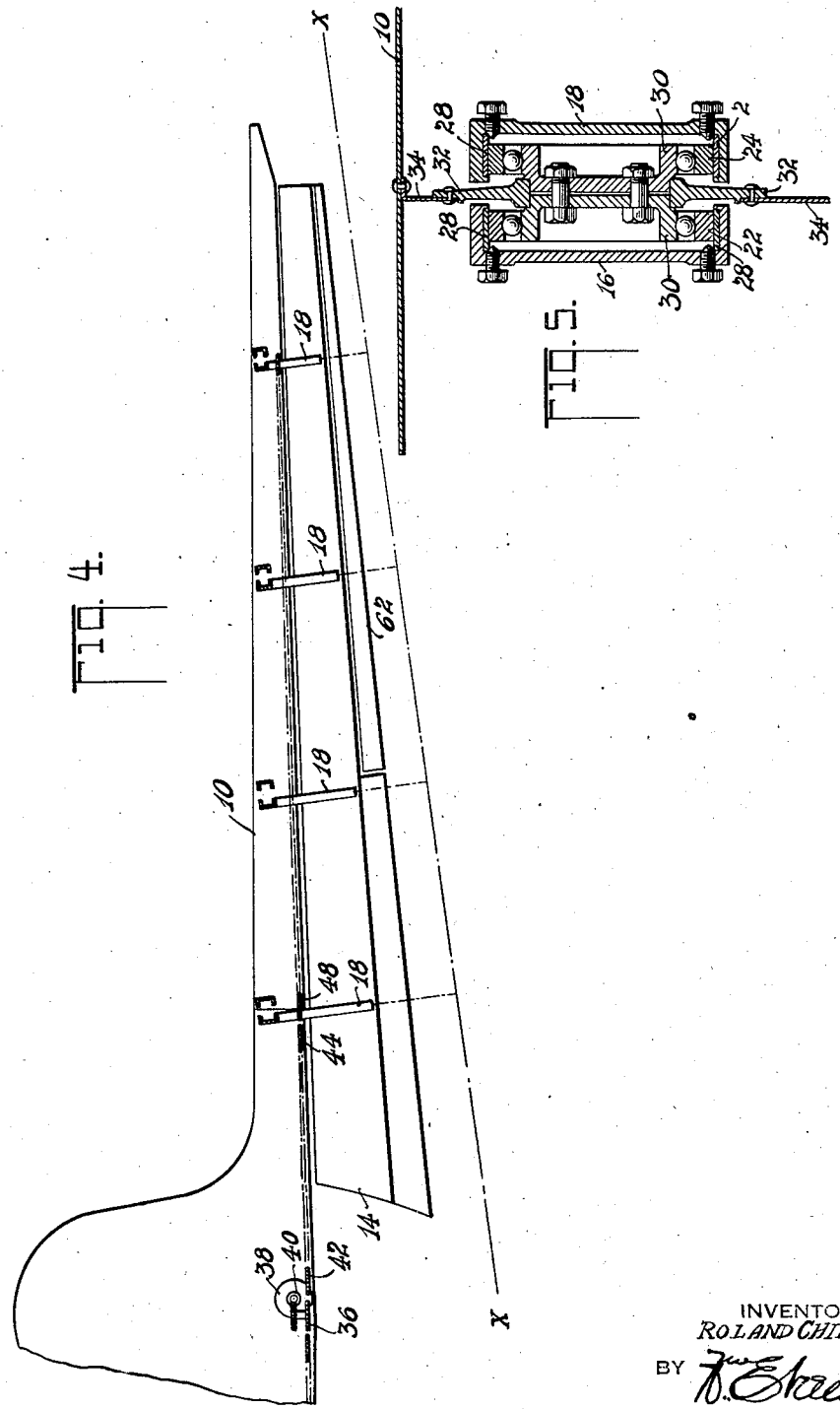

2,222,935

UNITED STATES PATENT OFFICE 2,222,935

VARIABLE AREA-AND-CAMBER WING

Roland Chilton, Ridgewood, N. J.

Application August 4, 1938, Serial No. 223,027

6 Claims. (Cl. 244—43)

This invention relates to variable area-and-camber wings for aircraft, and provides new and improved means whereby the wing section may be changed from minimum drag to maximum lift profiles, and vice versa.

Included in the objects of the invention are: (a) to provide a practicable structure which will give a larger variation in camber than the devices of the prior art; (b) to provide a structure which will, in maximum camber condition, give a "fairer" wing section than is obtainable with conventional flap devices; (c) to obtain a substantial increase in chord simultaneously with an increase in camber; (d) to provide a large increase in camber for the high lift condition without substantial shift in the center of pressure; (e) to provide a structure involving small change in angle of attack as between minimum drag and maximum lift conditions; (f) to provide a variable camber organization suitable for cantilever and skin-stressed wings and which provides for a large range of camber change without interfering with the structural integrity of the main wing member; (g) to provide a variable area-and-camber wing wherein the required operating forces are reduced to a minimum; and (h) to provide a wing which in "closed" or minimum camber position will have a smooth surface profile of the desired aerodynamic section for the high speed condition.

Other objects and advantages of the invention will be obvious from or will be pointed out in the following description with reference to the drawings, in which:

Fig. 1 is a diagrammatic cross-section through the wing, in high-speed or retracted condition;

Fig. 2 is a similar cross-section with the wing section extended to give maximum camber and chord for take-off and landing;

Fig. 3 is a diagrammatic inverted plan view showing the wing extended;

Fig. 4 is a diagrammatic front view of one wing; and

Fig. 5 is a sectional detail showing the roller supports.

In the above figures, due to the necessarily small scale, the thickness of the wing skin material has been shown greatly exaggerated so as to clearly distinguish the sectioned from the un-sectioned portions thereof.

It is known that, for optimum high speed performance, the desired wing section approaches closely to a symmetrical streamline of little or no camber, but that, if all other conditions could be disregarded, the optimum wing for minimum flight speed would have an extremely deep camber; and this invention aims at providing a variable wing structure which shall be adjustable from one extreme to the other.

Referring first to Fig. 1, the main wing structure comprises a rigid central portion 10 which may be of conventional stressed skin construction. The under surface of this rigid structural wing member and the mid-part of its upper surface are formed to a desired high speed airfoil section, but the front and back upper portions of the profile are cut away, the section being restored to the desired high speed profile by a front auxiliary wing 12 and a rear auxiliary wing 14, respectively. The parting surface between the auxiliary wing and the upper front and rear portions of the rigid wing are made arcuate, and each auxiliary wing is provided with a number of cantilever guide tracks 16—18 which are made arcuate about approximately the same center as the parting surfaces.

Preferably, the centers of curvature of the arcuate track members 16—18 are displaced somewhat from that of the boundary surface of the wing which is to be covered by the auxiliary wing in contracted position. This will permit the auxiliary wing to be nested close against the wing surface and yet to clear as soon as extending motion has been initiated. In the retracted condition of Fig. 1 a definite clearance between the auxiliary wing and the adjacent wing surfaces has been indicated for clearness of disclosure, since the diagrams are difficult to read if actual contact be shown.

The guide tracks 16, rigid with the front auxiliary wing 12 engage rollers 20—22, while the guide tracks 18 of the rear auxiliary wing 14 engage rollers 24—26. The rollers 22—24 are on common centers at the mid-width of the wing as illustrated in the section of Fig. 5, and the guide tracks comprise channels preferably provided with wearing strips 28. In this detail figure the rollers are shown mounted on anti-friction bearing hubs 30 rigidly secured to brackets 32 which are in turn rigid with ribs 34 of the wing 10.

The inverted plan view of Fig. 3 shows the auxiliary wing extended. In this instance, the design is for a tapered wing, making it necessary for the various guide tracks 16—18 to be laid out on conical coordinates; the cone axis being indicated by the dotted line X—X, Fig. 4, which defines the axis upon which the radii of the arcuate tracks are struck, so that the radius of the several tracks gets progressively larger from the wing tip to the wing root. All of the supporting track members swing through the same angle, but due to this variation in radius necessary on a tapered wing, the movement of the outer tracks, measured circumferentially, is less than that of the inboard tracks.

The control means for the auxiliary wings comprises chains or cables as follows: An inboard chain passes over a sprocket 36 driven by a suitable motor 38 and reduction gearing 40. From the sprocket 36 the chain extends to and passes over a guide sprocket 42 and thence outboard over a second guide sprocket 44. From the sprocket 44 the chain extends rearwardly over a driving sprocket 46 and thence forwardly again and over a third guide sprocket 48. From the sprocket 48 it crosses as at 50 to a symmetrical disposition at the opposite side of the airplane (not shown), thus comprising an endless chain or cable disposition.

Above and rigid with the sprocket 46 is a second and smaller driving sprocket 52 (see Figs. 1 and 2). From this smaller sprocket 52 an endless chain or cable in each wing passes outwardly over a guide sprocket 54; thence forwardly to a second guide sprocket 56, thence backwardly over a third guide sprocket 58, and thus back to the sprocket 52.

It will now be seen that the two chains or cables in each wing have each two fore and aft leads which will move in opposite directions when the motor 38 is operated. Suitable extension arms 60, rigid with the inner and outer end tracks 16—18 of the front and rear auxiliary wings, respectively, engage these fore and aft leads.

The difference in size of the compound sprockets 46—52, by which the inboard and outboard chain or cable systems are connected, is so proportioned as to give the desired ratio in movement between the inboard and the outboard tracks 16—18 to conform to the conic geometry of this tapered wing disposition.

The rear auxiliary wings are provided with ailerons 62 having operating shafts 64 equipped at their inboard ends with bevel gears disposed in a suitable housing 66 whereby rotary motion is conveyed from fore and aft telescopic shafts 68—70. The pilot's aileron control chains or cables 72 are led over suitable pulleys or sprockets 74 on the shaft 70, this disposition being symmetrical for the other wing. It will be understood that the telescopic shaft element 68 moves fore and aft with the auxiliary wing while the shaft element 70 is carried on the airplane structure in a suitable swiveling bearing 76.

I am aware that the art shows wings having a rigid central portion with front and rear portions extensible therefrom. An important feature of the present invention, however, resides in the disposition of the junction surfaces between the fixed and movable elements by disposing the surfaces to substantially conform to the arcuate path of travel of the auxiliary wings or movable elements. It will be seen by reference to Fig. 2 that the entire upper surface of the extended wing conforms closely to a deeply cambered arc with small profile interruptions. In the prior art, the junction between the movable and fixed portions has been substantially vertical requiring sliding plates to bridge the gap formed as the wing is extended.

In the present case, the structure has been shown extended to the point where the auxiliary wings have zero overlap with the wing. It may be found that further extension, providing slots, may be desirable, and such a disposition is intended to be within the scope of this invention.

The first impression on viewing Fig. 2 is apt to be that the extended guide members 16 and 18 comprise an interruption to the under surface profile. Actual reference to the plan and front views, Figs. 3 and 4, will show that these members occupy such an insignificant percentage of the span that they may be virtually neglected, so that the effective wing section is that defined by the skin material.

It is intended that this variable camber organization will be effective both for take-off and for landing, since the aim is to have the L/D in the extended position more favorable than obtainable with conventional hinged or split flaps which comprise a sudden angular break towards the rear of the wing.

The use of fore and aft auxiliary wings conformed in extended position to a generally consistent arcuate camber also avoids the large center of pressure shift associated with conventional trailing edge flaps. Such large rearward motion of the center of pressure limits the lift increase that may be obtained, without inducing excessive nose heaviness with conventional flaps. Cases are known where it has been impossible to keep the nose of the airplane up when the engines are used with the flaps down, which is one reason why conventional split flaps are not normally usable to assist take-off.

It is also an important feature of this invention that the control forces, i. e., the end reactions on the arcuate guide tracks are reduced to small values. In a theoretical wing element having a camber comprising a circular arc, the resultant of the aerodynamic forces (neglecting skin friction) must pass through the center of curvature and, if supported to swing around this center, the element will be in stable equilibrium in all attitudes and would require zero control forces.

Wind tunnel tests on the actual auxiliary wings will be necessary to determine the location of the center of swing for minimum control reactions. The guide tracks will preferably be curved about this center. Obviously, the resultant proportions will not depart drastically from those indicated in the showings. For simplicity, the desired result may be approximated by straight guide means conformed to the mean slope of the theoretical arc.

The actual loads on the track-supporting rollers are necessarily of substantial magnitude in the extended position. The aerodynamic load per auxiliary wing will be of the order of ¼ of the instant wing load, and with four guides per auxiliary wing, the load on the front and rear rollers will approximate one-half this value, or ⅛ of the instant wing load. These forces, however, are normal to the guide surfaces, producing no end reactions thereon, and therefore do not affect control loads.

The above conditions are sharply contrasted to the hinged leading and trailing edge elements of many variable camber or flapped wings of the prior art, in which high hinge moments devolve on the control which may be said to comprise part of the supporting means of the hinged elements. The supporting and control reactions are segregated in the present invention, the guiding means performing the former function independently of the control.

The terms "arcuate tracks" or "guides" used in the specification and claims are intended to cover any means for supporting the auxiliary wings for movement along paths of the geometry specified. For instance, linkage systems may be proportioned so as to provide a virtual center at the desired location.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a composite airplane wing, a fixed wing portion, auxiliary leading and trailing wing portions each extensible and retractable in relation to said fixed wing portion, each said wing portion having a chord section tapering from thick to thin and said auxiliary wing portions having their thin section areas overlapping the thick section areas of the fixed wing portion when retracted and having their thin section areas in close proximity to the thin section areas of the fixed wing portion when extended, and means to extend and retract said auxiliary wing portions.

2. In a variable area and variable camber wing, a fixed wing portion having a chord section tapering from thin to thick from its opposite edges toward its mid-section, a leading edge auxiliary wing portion substantially coextensive in length with said fixed wing portion and having a chord section tapering from thin at its trailing edge to thick at a point forwardly removed from said trailing edge, a trailing edge auxiliary wing portion substantially coextensive in length with said fixed wing portion and having a chord section tapering from thin at its leading edge to thick at a point rearwardly removed from said leading edge, said auxiliary wing portions being extensible and retractable in relation to said fixed wing portion, and when retracted being so related to said fixed wing portion as to provide a composite wing having a maximum thickness substantially equal to the maximum thickness of said fixed wing portion alone, and means to extend and retract said auxiliary wing portions.

3. In a variable area and variable camber wing, a fixed wing portion having a chord section tapering from thin to thick from its opposite edges toward its mid-section, a leading edge auxiliary wing portion substantially coextensive in length with said fixed wing portion and having a chord section tapering from thin at its trailing edge to thick at a point forwardly removed from said trailing edge, a trailing edge auxiliary wing portion substantially coextensive in length with said fixed wing portion and having a chord section tapering from thin at its leading edge to thick at a point rearwardly removed from said leading edge, said auxiliary wing portions being extensible and retractable in relation to said fixed wing portion, and said auxiliary wing portions having their thin section areas overlying the thick section areas of the fixed wing portion when retracted and having their thin section areas in close proximity to the thin section areas of the fixed wing portion when extended, and means to extend and retract said auxiliary wing portions.

4. In an airplane wing, a fixed wing portion tapering in chord section from thick substantially mid-way its chord length to thin at its leading edge and trailing edge respectively, a leading edge auxiliary wing portion tapering from thick substantially mid-way its chord length to thin at its trailing edge, a trailing edge auxiliary wing portion tapering from thick substantially mid-way its chord length to thin at its leading edge, said auxiliary wing portions being extensible and retractable in relation to said fixed wing portion and when retracted forming with said fixed wing portion a composite wing having an overall thickness at its mid-section substantially equal to the maximum thickness of said fixed wing portion, and said auxiliary wing portions when retracted being adapted to lie nested upon said fixed wing portion with the thin section areas thereof overlying the thick section areas of the fixed wing portion, and means to extend and retract said auxiliary wing portions.

5. In a variable area and variable camber wing, a fixed wing portion, extensible leading and trailing wing portions each having chord sections tapering from thick to thin, said extensible wing portions when retracted being adapted for nesting with the thicker portion of each over a thin portion of said fixed wing, and means to extend and retract said extensible wing portions.

6. In a composite airplane wing of given maximum thickness, a fixed central wing portion tapering in thickness from thin at its leading and trailing edges to said maximum thickness at a point intermediately of said edges, front and rear auxiliary wing portions having lower surfaces nestable upon the upper surface of said fixed wing portion and profiled to materially increase when nested the thickness of the composite wing at the leading and trailing edges thereof, said auxiliary wing portions being substantially coextensive in length with said fixed wing portion, and means to extend and retract said auxiliary wing portions.

ROLAND CHILTON.